US012710765B2

(12) United States Patent
Rychazhnikov et al.

(10) Patent No.: US 12,710,765 B2
(45) Date of Patent: Aug. 18, 2026

(54) SYSTEM AND METHOD FOR MAPPING VECTORIZATION AND NAVIGATION SYSTEM USING CONVOLUTIONAL NEURAL NETWORK

(71) Applicant: Aliensense Limited, Abu Dhabi (AE)

(72) Inventors: Andrei Rychazhnikov, Abu Dhabi (AE); Alex Lapir, Dubai (AE)

(73) Assignee: Aliensense Limited, Abu Dhabi (AE)

( * ) Notice: Subject to any disclaimer, the term of this patent is extended or adjusted under 35 U.S.C. 154(b) by 0 days.

(21) Appl. No.: 18/815,106

(22) Filed: Aug. 26, 2024

(65) Prior Publication Data

US 2026/0056554 A1 Feb. 26, 2026

(51) Int. Cl.

| | |
|---|---|
| ***G05D 1/646*** | (2024.01) |
| ***G05D 1/246*** | (2024.01) |
| ***G06V 10/44*** | (2022.01) |
| ***G06V 10/82*** | (2022.01) |
| ***G06V 20/17*** | (2022.01) |
| *G05D 101/15* | (2024.01) |
| *G05D 109/20* | (2024.01) |
| *G05D 111/10* | (2024.01) |
| *G05D 111/30* | (2024.01) |

(52) U.S. Cl.

CPC ............. *G05D 1/646* (2024.01); *G05D 1/246* (2024.01); *G06V 10/443* (2022.01); *G06V 10/82* (2022.01); *G06V 20/17* (2022.01); *G05D 2101/15* (2024.01); *G05D 2109/20* (2024.01); *G05D 2111/10* (2024.01); *G05D 2111/30* (2024.01)

(58) Field of Classification Search

CPC .... G05D 1/646; G05D 1/246; G05D 2111/30; G05D 2109/20; G05D 2101/15; G05D 2111/10; G06V 20/17; G06V 10/443; G06V 10/82

See application file for complete search history.

(56) References Cited

U.S. PATENT DOCUMENTS

| | | | | |
|---|---|---|---|---|
| 10,936,907 | B2 | 3/2021 | Suresh et al. | |
| 10,937,186 | B2 * | 3/2021 | Wang | G06V 10/82 |
| 11,698,272 | B2 | 7/2023 | Kroepfl et al. | |
| 11,835,357 | B2 | 12/2023 | Zhang et al. | |
| 12,230,026 | B2 * | 2/2025 | Behzadan | G06V 20/10 |
| 2017/0124415 | A1 | 5/2017 | Choi et al. | |

(Continued)

FOREIGN PATENT DOCUMENTS

| | | |
|---|---|---|
| CN | 105938559 A | 9/2016 |
| CN | 106529517 A | 3/2017 |

(Continued)

OTHER PUBLICATIONS

Elghazaly, G. et al., “High-definition maps: Comprehensive survey, challenges, and future perspectives”, IEEE Open Journal of Intelligent Transportation Systems 2023, vol. 4, pp. 527-550.

(Continued)

*Primary Examiner* — Ramsey Refai
(74) *Attorney, Agent, or Firm* — Jayne Saydah

(57) ABSTRACT

An onboard navigation system for vehicles in GPS-denied environments using image-based mapping. A mapping vectorization and navigation system uses a convolutional neural network (CNN) to improve the speed of recognition, orientation, and navigation while avoiding the use of GPS/GNSS signals.

20 Claims, 8 Drawing Sheets

(56) References Cited

U.S. PATENT DOCUMENTS

| | | | |
|---|---|---|---|
| 2019/0130188 A1 | 5/2019 | Zhou et al. | |
| 2019/0236414 A1 | 8/2019 | Totolos, Jr. et al. | |
| 2020/0050202 A1 | 2/2020 | Suresh et al. | |
| 2021/0158009 A1* | 5/2021 | Zhou | G06V 20/17 |
| 2022/0027642 A1 | 1/2022 | Shambik et al. | |
| 2022/0301274 A1 | 9/2022 | Dimond, Jr. et al. | |
| 2022/0327714 A1 | 10/2022 | Cook et al. | |
| 2022/0390237 A1 | 12/2022 | Elgersma et al. | |
| 2023/0029573 A1 | 2/2023 | Behzadan | |
| 2023/0298331 A1 | 9/2023 | Gonzalez-Rivero et al. | |
| 2023/0298341 A1 | 9/2023 | Gonzalez-Rivero et al. | |

FOREIGN PATENT DOCUMENTS

| | | |
|---|---|---|
| CN | 109871939 B | 6/2021 |
| CN | 113255896 A | 8/2021 |
| CN | 113792621 A | 12/2021 |
| CN | 116109949 A | 5/2023 |
| CN | 117218201 A | 12/2023 |
| WO | 2023126914 A2 | 7/2023 |
| WO | 2024042508 A1 | 2/2024 |

OTHER PUBLICATIONS

Guan Jian et al: "A Survey of 6DoF Object Pose Estimation Methods for Different Application Scenarios", SENSORS, vol. 24, No. 4, Feb. 7, 2024 (Feb. 7, 2024), p. 1076.

Mirzaeian Ali et al: "Conditional Classification: A Solution for Computational Energy Reduction", 2021 22ND International Symposium On Quality Electronic Design (ISQED), IEEE, Apr. 7, 2021 (Apr. 7, 2021), pp. 325-330.

PCT App. No. PCT/IB2025/000451; International Search Report and Written Opinion mailed Dec. 18, 2025 (pp. 1-11).

PCT App. No. PCT/IB2025/000455; International Search Report and Written Opinion mailed Dec. 8, 2025 (pp. 1-10).

Yan Zhicheng et al: "HD-CNN: Hierarchical 1-20 Deep Convolutional Neural Networks for Large Scale Visual Recognition", 2015 IEEE International Conference On Computer Vision (ICCV), IEEE, Dec. 7, 2015 (Dec. 7, 2015), pp. 2740-2748.

Zhang, G. et al., "Online map vectorization for autonomous driving: A rasterization perspective", Advances in Neural Information Processing Systems 2023, vol. 36, pp. 31865-31877.

Zou Zhengxia et al: "Object Detection in 20 Years: A Survey", Proceedings of the IEEE, IEEE. New York, US, vol. 111, No. 3, Jan. 27, 2023 (Jan. 27, 2023), pp. 257-276.

App. No. PCT/IB2025/000461; International Search Report and Written Opinion mailed Jan. 21, 2026 (pp. 1-9).

Notice of Allowance dated Jun. 2, 2026; issued in U.S. Appl. No. 18/828,761.

Non Final Office Action dated May 29, 2026; issued in U.S. Appl. No. 18/828,754.

* cited by examiner

200

400

SYSTEM AND METHOD FOR MAPPING VECTORIZATION AND NAVIGATION SYSTEM USING CONVOLUTIONAL NEURAL NETWORK

TECHNICAL FIELD

This invention relates to the field of mapping, positioning, and image navigation processing, and more particularly, vectored map recognition with convolutional neural networks (CNNs).

BACKGROUND

Complex imaging systems are used to create layering and vectorization maps. Traditional systems use complicated multispectral imaging devices or GNSS (Global Navigation Satellite System) signal synchronization. This leads to the imaging navigation and positioning process being extremely difficult or even impossible to compute for most ground, sea, and aerial vehicles that rely on conventional EOI (Electro-optical imagery) video systems.

Generally speaking, multispectral imaging devices are image processing systems that capture data from multiple discrete bands of the electromagnetic spectrum in the form of multispectral models. These models use sensors with selective wavelength sensitivity and apply algorithms to process the acquired data. By analyzing the variations in reflected or emitted energy across different spectral bands, these models can identify and differentiate materials or objects based on their unique spectral characteristics.

Multispectral models are not without their drawbacks. The reliance on specialized sensors for capturing data across different wavelengths can lead to increased system complexity and cost. The high dimensionality of multispectral data poses processing and analysis challenges, requiring substantial computational resources and sophisticated algorithms. This can be particularly problematic in resource-constrained environments where power and processing capabilities are limited. Additionally, factors such as atmospheric conditions, illumination variations, and sensor noise can affect the accuracy and reliability of multispectral models, necessitating careful calibration and validation procedures. Improved systems and methods are needed to overcome these shortcomings.

SUMMARY

Systems and methods for image navigation and positioning processing utilize vectored maps recognition with convolutional neural networks (CNNs) to improve speed of recognition, orientation, navigation, and avoid use of GPS/GNSS signals.

A method is disclosed for navigating an autonomous vehicle in a location without the use of real-time satellite data. A reference vectored map of the location is provided and stored in a storage medium onboard the autonomous vehicle. A raster image of a landscape within the location is captured using an imaging system onboard the autonomous vehicle. A filtered image is created by applying an edge detection filter to the raster image to detect edges and define initial vector borders. A processor onboard the autonomous vehicle processes the filtered image through a first convolutional neural network (CNN) to produce a first vectored map. This first vectored map is compared, under control of the processor onboard the autonomous vehicle, the generated first vectored map with the reference vectored map to determine the current position of the autonomous vehicle within the location. The position of the autonomous vehicle is then changed based on the determined current position.

Alternative embodiments include variations, such as processing, by an FPGA control block onboard the autonomous vehicle, the raster image with a second CNN to create a second vectored map. The second vectored map in this embodiment comprises details not found in the first vectored map. Alternatively, the system further comprises an FPGA control block configured to process images through the edge detection filter, the first CNN, and a second CNN.

In some embodiments, first CNN is pretrained on training landscape datasets comprising different sets of landscape. In these embodiments, the pretraining can include training landscape datasets comprising images of specific environments, including urban, rural, forested, or aquatic environments.

In embodiments where an FPGA control block is used, the FPGA control block can be further configured to adjust processing priorities between the edge detection filter and convolutional neural networks based on real-time computational load and power availability onboard the autonomous vehicle. The FPGA control block can also be configured to manage data transfer between the image capture, storage, and processing units.

In an embodiment, creating a filtered image by applying a edge detection filter to the raster image to detect edges and define initial vector borders within the raster image includes applying the edge detection filter to determine the borders between different types of landscape areas, and turning these borders into vectors. In this embodiment, each vector is defined by the coordinates of two points, forming straight lines without any curves, to represent borders within the first vectored map.

In an embodiment, comparing the first vectored map and the reference vectored map comprises calculating the distance between vectors in the first vectored map and the reference map by subtracting their respective coordinates, with a lower calculated distance indicating a higher similarity between vectors, and using a quantity of similar vectors to assess the overall similarity of the first and previously stored vectored maps.

A system is also disclosed for navigating an autonomous vehicle in a given location without using satellite data. The system includes an autonomous vehicle, a processor onboard the autonomous vehicle, an onboard memory operably coupled to the processor, and a nonvolatile storage medium for storing vectored maps of the location. The system also includes an optical system comprising a camera, configured for capturing raster images of a landscape within the location. An image processing module comprising an edge detection filter and one or more convolutional neural networks (CNN) is also part of the system. The edge detection filter is configured for detecting edges and defining initial vector borders within the raster images. One or more CNNs are configured for producing a first vectored map and corresponding sets of landscape by processing the filtered images through one or more CNNs. The system also includes a control block, operably connected to the image processing module, configured for comparing the generated first vectored map with the previously stored reference vectored maps to determine a current position within the location. An onboard transmitter is provided and configured for sending the current position within the location to a destination.

Alternative embodiments are similar to alternative embodiments of the above method. For example, an onboard FPGA control block can process the first vectored map with a second CNN to create a second vectored map. In this embodiment, the second vectored map comprises details not found in the first vectored map. The system can also include an FPGA control block configured to process images through the edge detection filter and the first CNN and a second CNN. The first CNN can be pretrained on training landscape datasets comprising different sets of landscape. The pretraining of the first CNN can include using training landscape datasets comprising images of specific environments, including urban, rural, forested, or aquatic environments. An alternative method is also disclosed for determining the position of an autonomous vehicle without using satellite data. The operations include providing a reference vectored map of a location, in a storage medium onboard the autonomous vehicle. A raster image of a landscape within the location is captured using an imaging system onboard the autonomous vehicle. A filtered image is created by applying an edge detection filter to the raster image to detect edges and define initial vector borders within the raster image of the landscape. The operations also include processing, under control of a processor onboard the autonomous vehicle, the filtered image through a first convolutional neural network (CNN) to produce a first vectored map. A comparison is made, under control of the processor onboard the autonomous vehicle, between the generated first vectored map and the reference vectored map to determine the current position of the autonomous vehicle within the location. The location of the autonomous vehicle is then transmitted to a remote location.

In alternative embodiments, a Field-Programmable gate array (FPGA) control block adjusts processing priorities between the edge detection filter and convolutional neural networks based on real-time computational load and power availability onboard the autonomous vehicle. The FPGA control block can also manage data transfer between the imaging system, onboard storage, the onboard edge detection filter, and the first CNN.

This summary is not intended to describe each illustrated embodiment or every implementation of the subject matter hereof. The figures and the detailed description that follow more particularly exemplify various embodiments.

Figure 1:
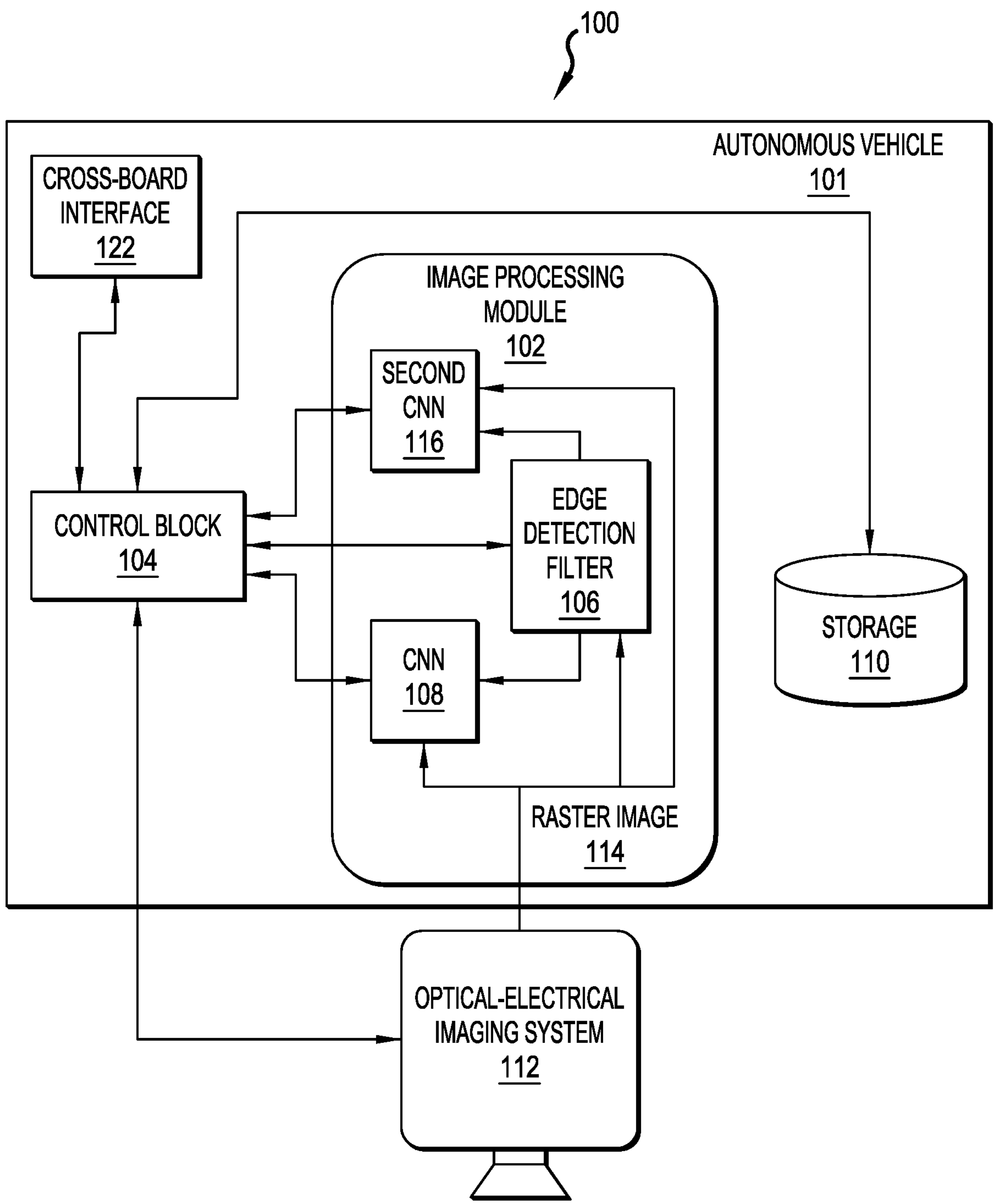
FIG. 1 is an exemplary embodiment of a system for mapping vectorization and navigation.

The embodiments described are exemplary ways to use the invention to solve technical problems in the field of the invention. The solutions and techniques disclosed may also be used to solve other problems in the field or to solve similar problems in other fields. Substitutions, modifications, and equivalents known to those of skill in the art may be used to implement these solutions and techniques, consistent with scope of the invention described in the claims.

DETAILED DESCRIPTION

An onboard navigation system for vehicles in GPS-denied environments using image-based mapping is disclosed. A mapping vectorization and navigation system uses a convolutional neural network (CNN) to improve the speed of recognition, orientation, and navigation while avoiding the use of GPS/GNSS signals.

Raster images are captured by a vehicle-mounted imaging system, typically including a camera. Generally speaking, these raster images are transformed into detailed vector maps for navigation, achieved through image capture, edge detection, CNN-based map generation, and map comparison.

An edge detection filter such as a Sobel filter is used to process raster images for edge detection and vectorization. The images are also processed by CNN to generate a detailed vector map. The maps created by the system are compared with reference maps to localize the vehicle. In an embodiment, map accuracy is enhanced with a second CNN.

In an embodiment, the first or second CNNs (or both) are pretrained using datasets relevant to the navigation task. These datasets comprise a wide variety of labeled images representing different terrain types and environmental conditions, including urban landscapes, forests, deserts, mountainous regions, and bodies of water under various lighting and weather scenarios. During pretraining, the CNNs learn to recognize and distinguish different sets of landscape. This process enables the networks to develop classification capabilities, allowing for accurate and efficient real-time interpretation of incoming visual data during autonomous navigation. The pretrained CNNs can effectively generalize from the learned data to identify various environments, improving the reliability and safety of the navigation system across various operational contexts. In an embodiment, the navigation system uses an FPGA control block. This FPGA control block can adjust processing priorities and data transfer based on available resources.

A raster image is composed of pixels, while a vectored image is composed of paths. Raster images are more resource-intensive than vector images, and raster images lose quality when scaled. When raster images captured by the imaging system are converted into vectored maps, this reduces the compute and power required for the imaging system.

In an embodiment, a raster image of a landscape is captured using an imaging system installed on an autonomous vehicle, such as a plane or UAV. The raster image of a landscape is stored in memory. In an embodiment, the image is transferred to the CNN for landscape type recognition and to a Sobel filter for vectorization. The CNN determines the type of ground landscape present in the image, such as building areas, forests, rivers, etc. The edge detection filter detects the borders between different types of landscape areas and turns these borders into vectors. This process creates a resource-efficient vectored map that can be analyzed and compared with similar maps for a location that have already been created and stored onboard the vehicle. The comparison includes calculating differences between a plurality of vectors. The difference between the plurality of vectors is a plurality of differences between all vectors inside an area of interest. In one example, three vectors can be used to have a closed circuit around an area of interest. In another example, the border around a given landscape area can comprise tens or hundreds of vectors.

The CNN is used to improve the speed of landscape recognition, orientation, and navigation. This is achieved while avoiding reliance on GPS/GNSS signals and reducing the processing power required for the system. Using CNNs also simplifies complexity across the system. Instead of using complex multispectral imaging devices, a CNN could be even used along with a simple imaging system comprising an RGB camera with a resolution of 1080p or 720p. This straightforward setup, which typically includes a conventional CMOS or CCD sensor, is sufficient for capturing the necessary visual data for the CNN to process and create vectored maps.

In an embodiment, an airborne imaging system captures a raster image of the terrain below. Raster images, also known as bitmap images, are digital representations of pictures formed by a grid of pixels. Each pixel stores color or grayscale information, and the arrangement of pixels determines the overall image. Images are built from individual pixels, with each pixel contributing to the overall color and detail. Image quality is directly tied to the number of pixels. Higher resolution (more pixels) results in sharper images, while lower resolution (fewer pixels) leads to pixelation and blurry details. Popular raster image formats include JPEG, PNG, GIF, TIFF, and BMP. Captured images are stored in memory coupled to an onboard computing device. These images stored onboard the vehicle are available for processing by one or more CNNs and by an edge processing filter.

The onboard CNN generally identifies the type of terrain present in the image by comparing segments of a current image with a collection of pre-labeled images that were used during its training phase. These labeled images can include tens of thousands of aerial photographs of various landscapes, such as forests, lakes, cities, villages, roads, rivers, coastlines, and deserts. When a new image is processed, the CNN does not abstract features or patterns; rather, it directly matches portions of the input image to those in the pretrained dataset. The CNN essentially answers the question, "What does this fragment of the input image look like?" by determining whether the fragment resembles a known type of terrain, such as a forest or a city. This process allows the CNN to classify the terrain into predefined categories, such as urban areas, forests, dense forests, farmlands, and water bodies (e.g., rivers, lakes, reservoirs), based on its similarity to the labeled examples in the training data.

The onboard edge detection (e.g. Sobel) filter detects the boundaries between different terrain types and converts these boundaries into vectors, effectively transforming the raster image into a compact vector representation. This vectored map is computationally efficient and can be more quickly and efficiently analyzed, compared with similar maps, and used for navigation or other GIS applications. A Sobel filter works by calculating the image intensity gradient at each pixel, which measures the change in intensity between neighboring pixels. This gradient information is used to identify areas where the intensity changes rapidly, which typically correspond to edges in the image. For example, the Sobel filter can use two small 3×3 kernels (matrices) to approximate the gradient in the horizontal and vertical directions. These kernels are applied separately to the image, and the resulting gradients are combined to produce the final edge map.

In an embodiment, the Sobel filter involves the convolution of an image with two 3×3 kernels designed to approximate gradients in horizontal and vertical directions. Each kernel element acts as a weight applied to its corresponding image pixel. Convolution multiplies each image pixel by its respective kernel element and sums the results. This process, repeated for every pixel, produces horizontal and vertical gradient images. The gradient magnitude at each pixel is calculated (for example, using the Pythagorean theorem), and the gradient direction is found (for example, using the arctangent function). A final edge map is created by thresholding the gradient magnitude. The Sobel filter can be implemented using libraries and frameworks such as OpenCV, Scikit-image, Pillow, and MATLAB's Image Processing Toolbox.

In an embodiment, Field-Programmable Gate Arrays (FPGAs) are used for controlling aspects of the system. For example, an FPGA can be used in connection with a Sobel filter to take advantage of FPGA reconfigurability and parallel processing capabilities. The Sobel filter algorithm can be mapped onto the FPGA's logic fabric, enabling custom hardware pipelines and efficient processing. For higher speeds and minimal power consumption, custom hardware designs with dedicated circuits for convolution operations can also be used.

In alternative embodiments, hybrid approaches and hardware-accelerated software libraries can be used to implement the Sobel filter.

The use of a CNN for terrain classification eliminates the need for complex and expensive multispectral imaging systems because CNNs are capable of finding correlations between standard RGB images, which are readily available and do not require specialized sensors or pretrained datasets. Multispectral imaging systems rely on capturing data across multiple discrete bands of the electromagnetic spectrum to identify materials and objects based on their spectral characteristics, which often necessitates the use of costly and sophisticated sensors. In contrast, a CNN can achieve similar or even superior classification results by finding correlations with a huge amount of pretrained images representing a different types of landscape directly from conventional RGB images. This allows the system to operate with simpler, more affordable imaging hardware, reducing both the complexity and cost of the overall system. Additionally, because CNNs can be trained to identify a wide range of terrain types using diverse training datasets, they offer greater flexibility and adaptability to different environments without the need for hardware modifications, making them particularly suitable for resource-constrained platforms like UAVs.

In some embodiments, the second CNN is fine-tuned using real-time captured images specific to the autonomous vehicle's operational environment to enhance its accuracy and responsiveness to changing conditions. The fine-tuning process can be performed on-the-fly, allowing the second CNN to adapt to the environment in real-time. This involves comparing the real-time captured images with the expected outputs, identifying discrepancies, and making incremental adjustments to the CNN's parameters. For instance, if the vehicle moves from an urban environment to a more rural or forested area, the CNN can switch datasets to emphasize different sets of landscape, such as identifying natural obstacles, different types of vegetation, or less distinct pathways, that were not as relevant in the urban setting.

In some embodiments, this fine-tuning process may be managed by an onboard processing unit, such as an FPGA control block, which dynamically allocates resources to balance the computational load between the real-time processing of images and the fine-tuning of the CNN. The result is a more adaptive and context-aware navigation system, capable of maintaining high accuracy and reliability across diverse and changing operational environments.

The accuracy assessment can be performed by analyzing the differences between the vectors in the generated map and those in the reference map. For example, the system may calculate the distance between corresponding vectors or evaluate the overall similarity score between the maps. If the accuracy falls below a predefined threshold, indicating potential misclassification or errors in the vector mapping process, this triggers an adjustment in the fine-tuning process. Additionally, in some embodiments, the system is configured to gather and store images along with their associated vector data during regular operation. These images can be later reviewed and incorporated into the training datasets during a scheduled update process. By periodically updating the training datasets with new and diverse environmental conditions or different sets of landscapes, the CNN's accuracy and reliability can be further improved over time. Moreover, it is important to recognize that discrepancies between the generated map and the reference map may not solely arise from inaccuracies in the CNN. These differences could also be due to actual changes in the landscape, such as deforestation, urban development, or the destruction of a previously existing landscape. In such cases, the system must recognize that the landscape has been altered and not simply adjust the CNN. Instead, the system should preserve the new vector map as a record of these changes, allowing the reference data to be updated to reflect the current state of the environment.

In some embodiments, the second CNN is pretrained using datasets that are augmented or generated by models like Generative Adversarial Networks (GANs), Variational Autoencoders (VAEs), or image generation tools like Midjourney. Additionally, a large language model (LLM) such as GPT-4 can be used to generate descriptive text that guides the creation of synthetic images by these image generation models. These models are capable of creating synthetic images that represent the same landscapes under different environmental conditions. For example, a GAN can take an image of a summer landscape with green grass and generate a corresponding image where the grass is covered by snow, simulating winter conditions. By training the second CNN on these artificially generated datasets, the system can learn to recognize and detect locations even when environmental conditions have significantly changed since the last dataset update.

In some embodiments, the FPGA control block onboard the autonomous vehicle is configured to dynamically adjust processing priorities between the edge detection filter, such as the Sobel filter, and the convolutional neural networks (CNNs) based on real-time computational load and power availability. This functionality guarantees that the system operates efficiently even under varying resource constraints, optimizing the performance of the navigation system.

The FPGA control block continuously monitors the computational load and power consumption of the various processing units involved in the navigation system. When the vehicle encounters situations where computational resources are limited-such as during complex image processing tasks or when power availability is reduced due to extended operations—the FPGA control block prioritizes the processing tasks to maintain critical functionality. For instance, if the system detects that the computational load is too high, the FPGA may allocate more processing power to the CNN responsible for terrain classification and map generation, while reducing the priority or computational resources allocated to the edge detection filter. This assures that the most critical tasks for determining the vehicle's location are completed on time, even if it requires a temporary reduction in the granularity of edge detection.

Conversely, in scenarios where power availability is limited-such as when the vehicle is operating in low-battery conditions—the FPGA control block can adjust the processing tasks to conserve energy. This might involve reducing the frequency of CNN operations, simplifying the convolutional processes by using fewer layers, or even temporarily offloading some of the edge detection tasks to a more power-efficient processor. The FPGA can also implement lower-resolution processing for certain tasks when full precision is not required, thereby reducing power consumption without significantly impacting the accuracy of the navigation system.

Additionally, the FPGA control block may implement a dynamic scheduling algorithm that adjusts processing priorities based on real-time needs. For example, during critical navigation maneuvers, such as obstacle avoidance or precise landings, the FPGA may prioritize the CNN operations to ensure rapid and accurate terrain classification, while deferring less critical tasks to conserve resources. The ability of the FPGA control block to balance computational load and power availability in real-time allows the autonomous vehicle to operate efficiently across a wide range of conditions, providing reliable performance while maximizing the use of available resources.

In some embodiments, the control block can evaluate raster images captured by optical-electrical imaging system and adjust optical-electrical imaging system settings in real-time. The settings can be gain, exposure, brightness, contrast, white-balance, HDR mode, etc.

FIG. 1 shows an exemplary system 100 for mapping vectorization and navigation. The system is onboard autonomous vehicle 101 and includes image processing module 102 under the control of control block 104. Edge detection filter 106 and CNN 108 are part of image processing module 102. Storage module 110 is coupled with optical-electrical imaging system 112. The optical-electrical imaging system includes components such as a lens and an optical-electrical sensor, such as complementary metal oxide semiconductor (CMOS), charge-coupled device (CCD), long-wave infrared (LWIR), or short-wave infrared (SWIR) sensor. Another component of optical-electrical imaging system 112 is an image-processing system configured to obtain high-quality captured images with low noise, natural colors, and effective contrast. Optical-electrical imaging system 112 collects raster images 114 and passes raster images 114 to edge detection filter 106 or CNN 108 for processing. Storage 110 stores vectored maps, including reference vectored maps of the location. Optionally, image processing module 102 includes a second CNN 116. In another embodiment, image processing module 102 can include additional CNNs, such as a third CNN, fourth CNN, and so on (though not depicted in FIG. 1). The operation of multiple CNNs is described in further detail below. Reference vectored maps in storage 110 are used for navigation by comparison with maps generated onboard vehicle 101, as will be explained in greater detail below.

A raster image 114, after being stored in storage 110, can be processed several ways. For example, CNN 108 can process image 114 first by edge detection filter 106 and then CNN 108. Alternatively, CNN 108 can process image 114 first and then by edge detection filter 106. Separate copies of image 114 from storage 110 can also be processed in parallel by edge detection filter 106 and CNN 108.

Cross-board interface 122 is used to connect the control block 104 to external devices. The information shared with external devices can be objects, classes, and subclasses. Cross-board interface 122 can be configured in various ways as a bridge or GIPO (General Purpose Input/Output). GIPO refers to a type of pin on an integrated circuit or electronic circuit board that can be configured by the user to perform different input or output functions. An RS-485 Bridge is a device that allows communication between two or more RS-485 networks. I2C bridges (also known as I2C multiplexers or I2C routers) are devices that allow multiple I2C devices to be connected to a single I2C bus. An SPI bridge is a device that allows communication between two or more Serial Peripheral Interface (SPI) networks or devices. A UART bridge is a device that allows communication between two or more Universal Asynchronous Receiver-Transmitter (UART) networks or devices. Cross-board interface 122 in its various configurations, acts as a translator, enabling data exchange between devices that have different protocols or data formats.

The collection and process of map images will be described with practical examples. In these examples, a data-rich image (FIG. 2 and FIG. 4) is processed, for example, by the onboard image processing module 102 of FIG. 1, to create a simplified image of a location that can be used as a basis for comparison with a stored reference image of the same location.

Figure 2A:
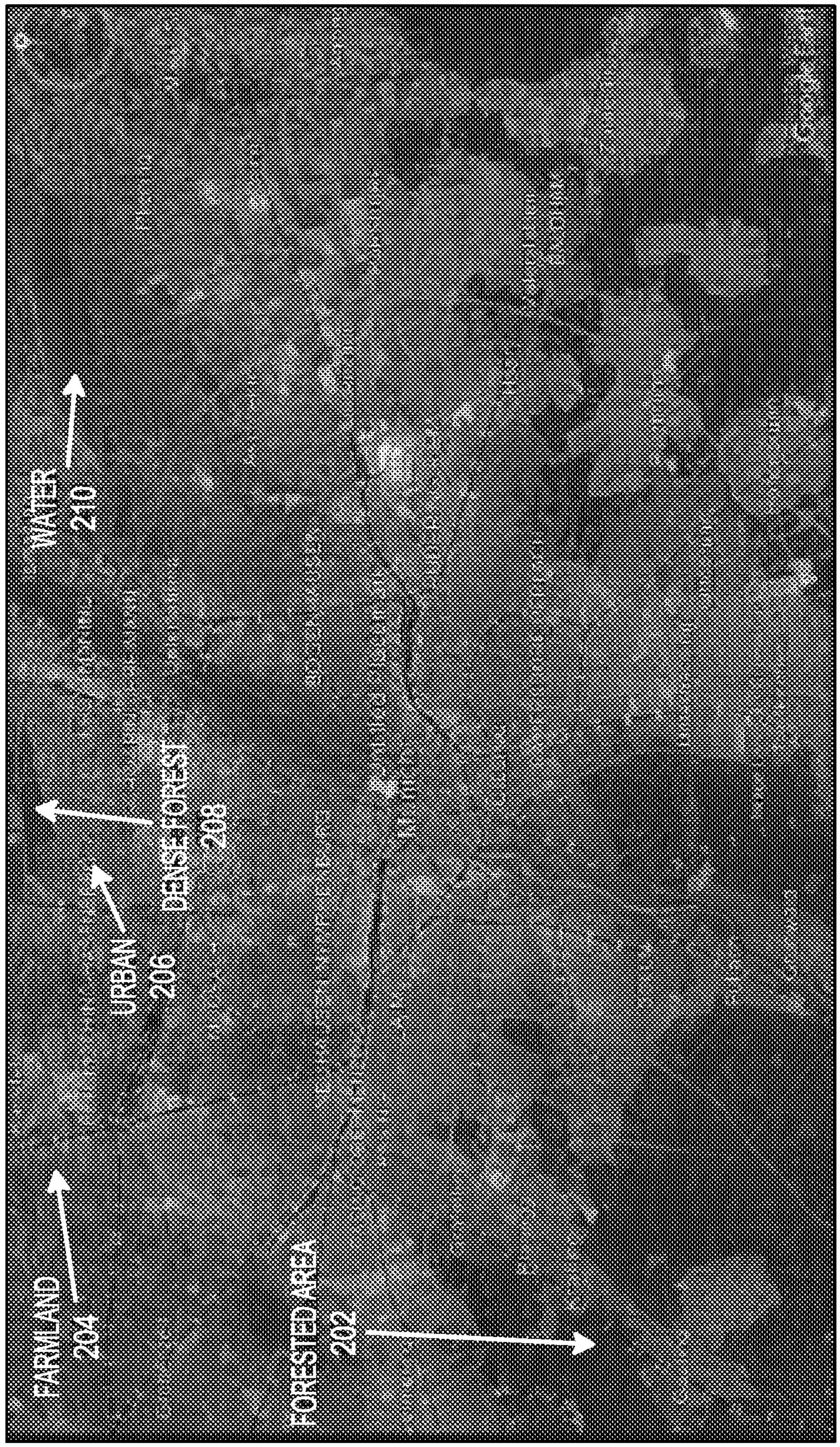
FIG. 2A is an example of a map image with a first scale.

FIG. 2A shows map image 200 of a location before any processing. The map includes a variety of landscapes, including forested area 202, farmland 204 (land under cultivation), urban area 206, dense forest 208, and water 210.

Figure 2B:
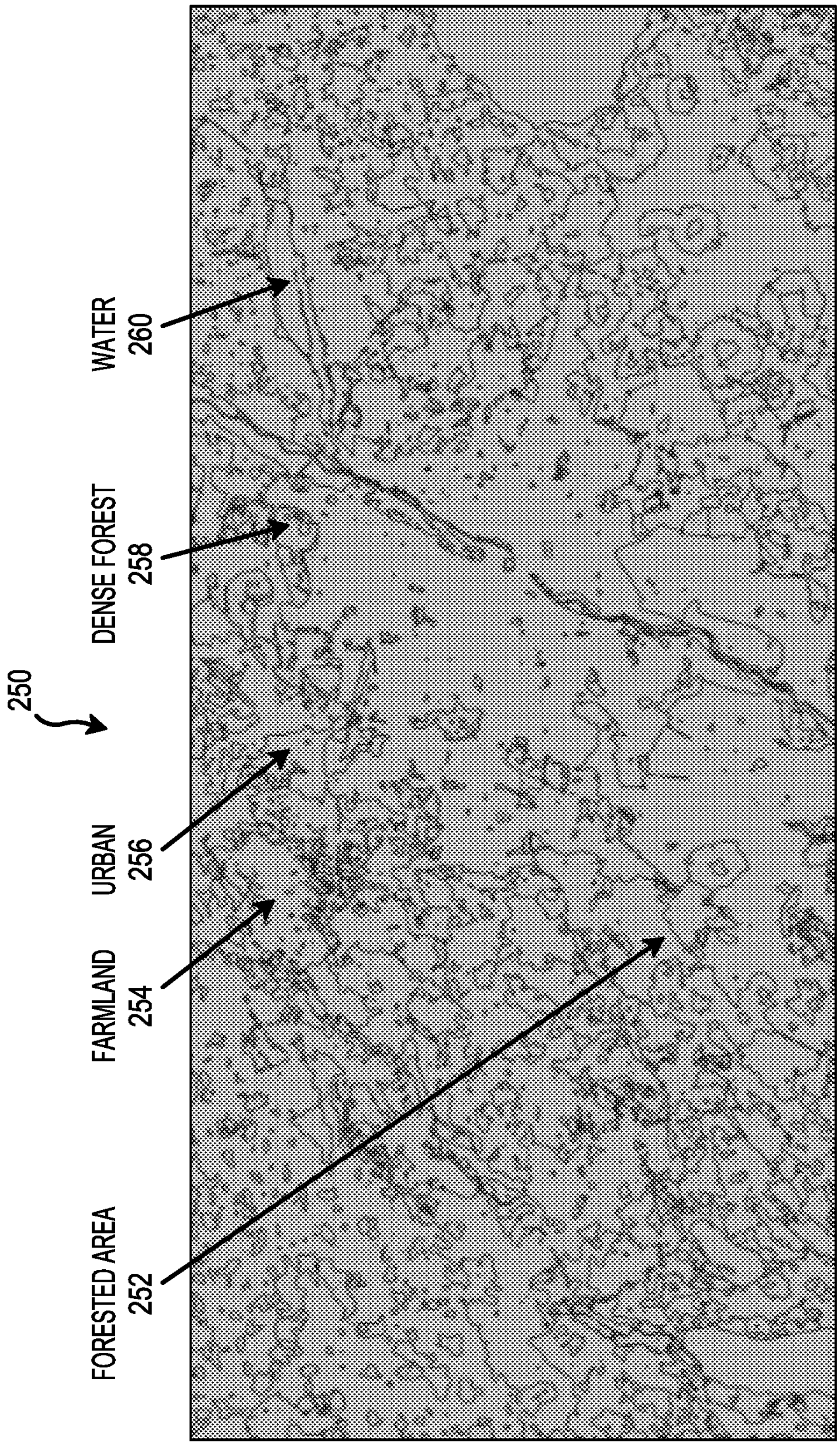
FIG. 2B is an example of a vectored map after Sobel filtering and before layering.

FIG. 2B is an example of a vectored map 250 for the same location as FIG. 2A after Sobel filtering. The edges of the landscapes in FIG. 2A are emphasized, but distinctions between light and dark areas are removed. For example, forested area 252 is a vector representation of forested area 202, farmland 254 is a vector representation of farmland 204, urban area 256 is a vector representation of urban area 206, dense forest 258 is a vector representation of dense forest 208, and water 260 is a vector representation of water 210. Forested area 252 in FIG. 2B corresponds to the forested area 202 in FIG. 2A. The vectored map abstracts this forested area into a series of vectors that outline the boundaries of the forest, simplifying the complex textures and colors present in the original image. Farmland 254 in FIG. 2B represents the farmland 204 shown in FIG. 2A. This farmland, originally depicted with varying shades to indicate different types of cultivation or land use, is now represented as a uniform vector shape in farmland 254, highlighting the borders of the cultivated area. Urban area 256 in FIG. 2B corresponds to the urban area 206 in FIG. 2A. The detailed structures and grid patterns that characterize the urban landscape in the original image are reduced to vector lines that delineate the urban area's overall shape, focusing on its spatial footprint in urban area 256. Dense forest 258 in FIG. 2B is the vector representation of the dense forest 208 from FIG. 2A. The dense forest, which might have complex visual details like tree density and canopy variations in the original image, is simplified into a distinct vector area that captures its overall extent in dense forest 256. Water 260 in FIG. 2B corresponds to water 210 shown in FIG. 2A. The various shades of blue or reflections seen in the water body in FIG. 2A are replaced with a clean vector boundary that precisely outlines the water's edges, facilitating easier interpretation and use in navigation systems in water 260. These vector representations in FIG. 2B provide a streamlined view of the landscape, focusing on essential boundaries and shapes, which can be more readily processed by the navigation system compared to the more detailed and visually complex image in FIG. 2A.

Figure 3:
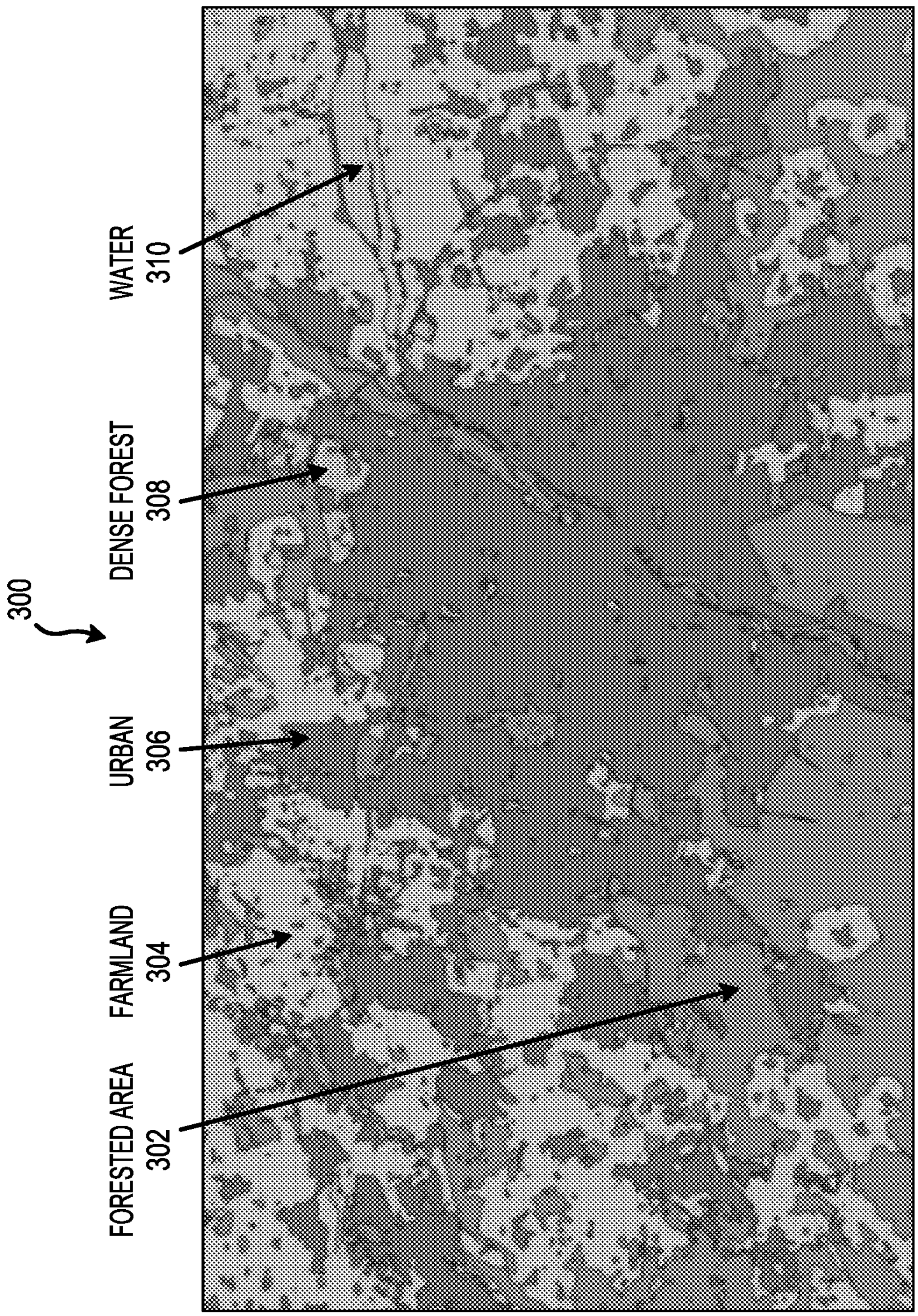
FIG. 3 is an example of a layered map of the same area as FIG. 2A.

FIG. 3 shows layered map 300, an image of the same location as FIGS. 2A and 2B after CNN processing. The CNN detects landscape details in the original image, such as forested areas 302, farmland 304, urban areas 306, dense forest 308, and water 310. The CNN converts these details into distinct colors (shown in grayscale in FIG. 3). For example, in an embodiment, forested areas are indicated by orange, farmland by light green, urban areas by purple, and water by dark green.

Figure 4:
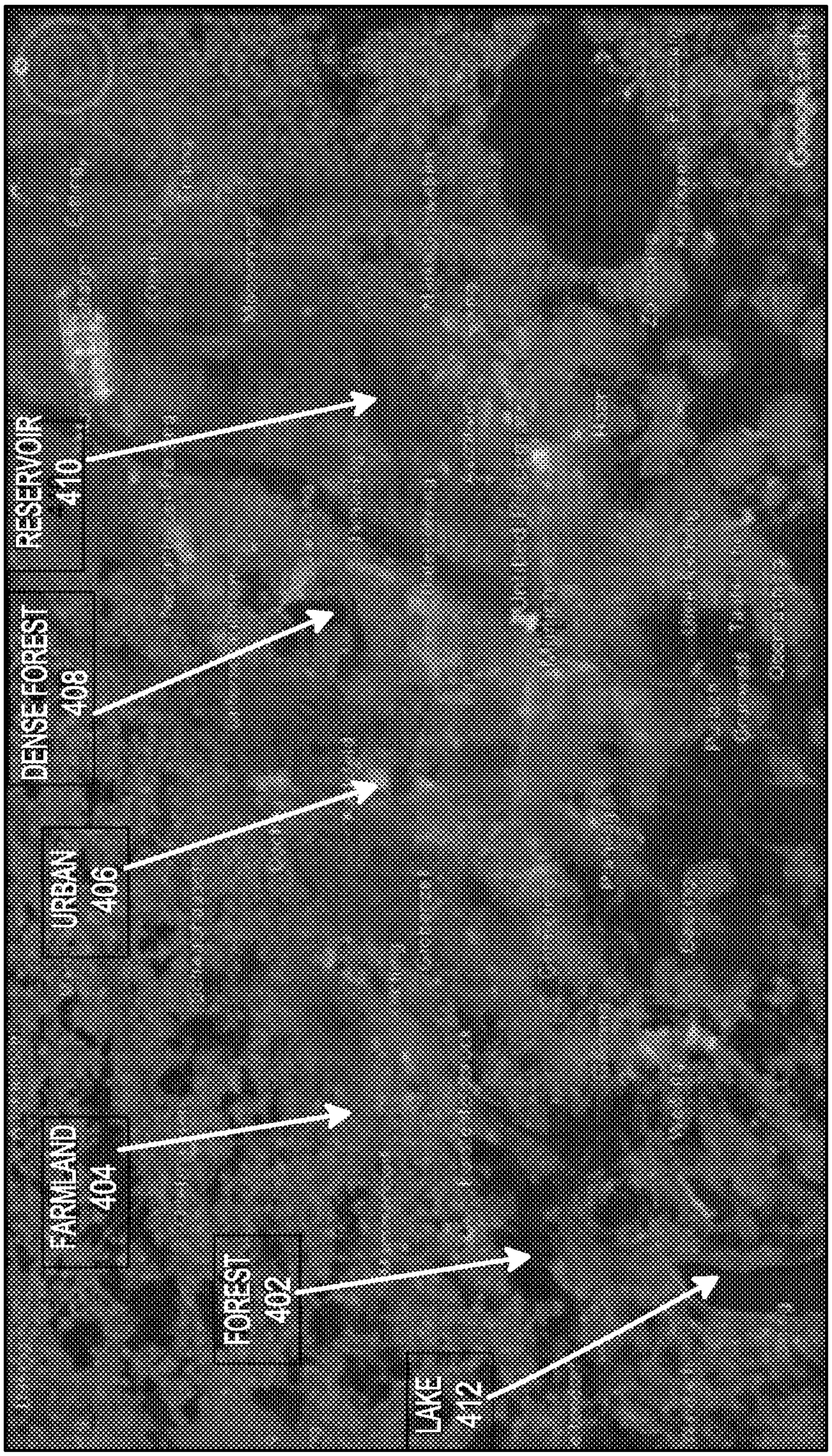
FIG. 4 is an exemplary map of a location with a different scale than FIG. 2A.

FIG. 4 shows a conventional map image 400 of the location in FIG. 2A, but in a smaller scale so that more repeating sets of landscape are visible. Sets of landscape similar to FIG. 2A are shown, such as forest 402, farmland 404, urban area 406, and dense forest 408. There are also multiple regions with water, including reservoir 410 and lake 412.

Figure 5:
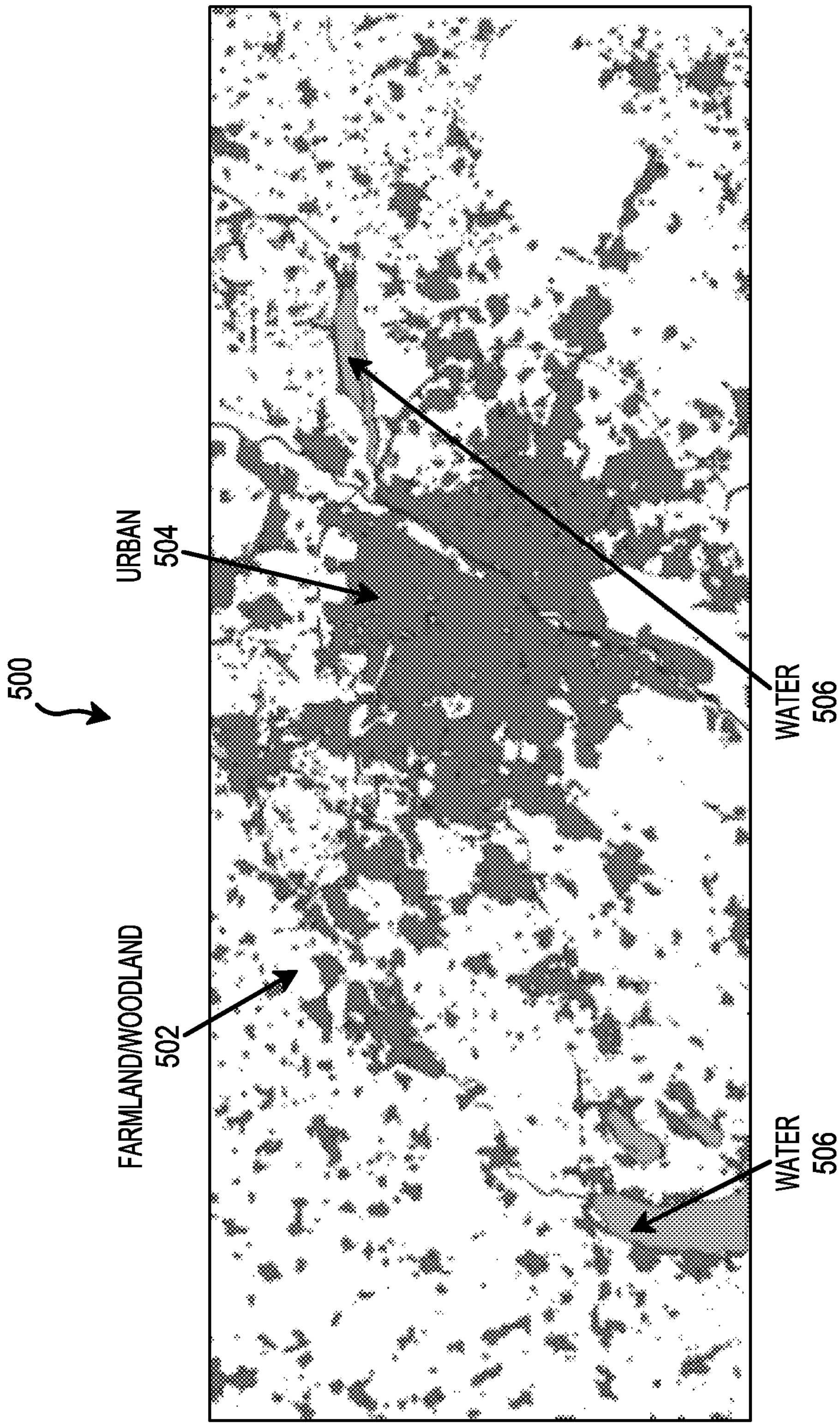
FIG. 5 is an example of the vectored map of the same area as FIG. 4 including layers showing urban areas and water.

FIG. 5 shows a vectored map 500 of FIG. 4 with layers showing urban (buildings) and water sets of landscape. Other sets of landscape, such as forests, dark forests, and farmland are not shown in vectored map 500. The reduction in image detail allows for more efficient processing in situations where landscape distinctions are not relevant for navigation. Element 502 (Farmland/woodland) in FIG. 5 corresponds to the farmland 404 and surrounding areas in FIG. 4. Vectored map 500 consolidates these areas into generalized regions, emphasizing the spatial extent of these landscape types without detailing every variation in the terrain. Element 504 (Urban) in FIG. 5 corresponds to the urban area 406 in FIG. 4. Vectored map 500 abstracts this urban region to focus on the overall distribution of built-up areas, reducing the complexity of individual structures that would otherwise be present in the conventional map. Element 506 and 508 (Water) in FIG. 5 correspond to the reservoir 410 and lake 412 seen in FIG. 4. Vectored map 500 identifies these water bodies as significant landmarks, essential for navigation, and reduces other water-related details that might not be crucial for the vehicle's navigation tasks. By focusing on these specific elements, vectored map 500 achieves a reduction in image detail, which allows for more efficient processing in scenarios where the distinctions between various landscape types are not as relevant for the autonomous vehicle's immediate navigation needs.

Figure 6:
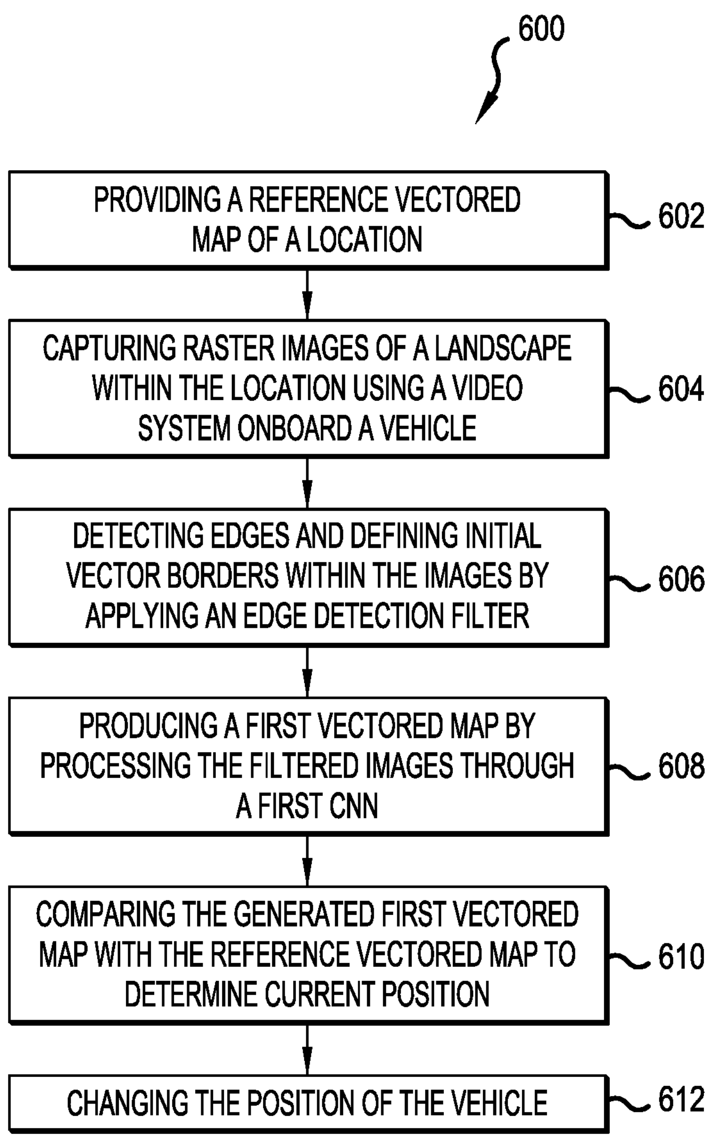
FIG. 6 is a flowchart of a method according to an embodiment.

FIG. 6 is a flowchart of a series of operations 600 according to an embodiment. At 602, a reference vectored map of a location is provided. In one aspect, the reference vectored map is captured by an imaging component. In another aspect, the reference vectored map has been previously captured and is provided to memory. This reference vectored map is stored onboard an autonomous vehicle. In the system of FIG. 1, for example, the reference vectored map can be stored in storage 110. At 604, images of a landscape within the location are captured, for example, by an optical system such as optical-electrical imaging system 112 of FIG. 1. Processing of the images takes place at 606, where an edge detection (e.g. Sobel) filter is applied to detect edges and define initial vector borders.

A first vectored map is then prepared by processing the images with a CNN at 608. Although the first vectored map in FIG. 6 is prepared using the output of the Sobel filter, the vectored map can also be prepared from raster images directly. Processing raster images can also be done in parallel by the Sobel filter and the CNN. When a vectored map of the location is ready, it is compared with the reference vectored map. Location can be determined by comparing vectors at given coordinates. The differences between the vectored map generated by the vehicle and the reference vectored map are calculated at 610 by calculating the differences between the plurality of tensors, each representing the border around some landscape area. A tensor generalizes the idea of a vector to encompass data arranged in multiple dimensions. Vectors are limited to a single dimension, representing information along a line, while tensors can represent data in matrices or higher-dimensional structures. Vector addition is a special case of tensor addition where the tensors involved have only one dimension. Both operations work by adding corresponding elements. Adding vectors is essentially tensor addition along a single dimension.

In an alternative embodiment, a second CNN can be used after 608 and before 610 to process the first vectored map to create a second, more detailed vectored map. In this embodiment, the second, more detailed vectored map is compared with the reference vectored map to determine the vehicle's location.

Once the vehicle's position has been determined from the differences in the vectored maps, the vehicle adjusts its position at 612. The adjustment in position considers the location details and landscape to create a path through the location. In one aspect, navigation logic instructions can select one route over another based on the determined landscape. For example, navigation logic can select an "open" path above a lake instead of a "blocked" path through a forest. The series of operations 600 is repeated to generate the vehicle's location iteratively as the vehicle moves through the location.

Figure 7:
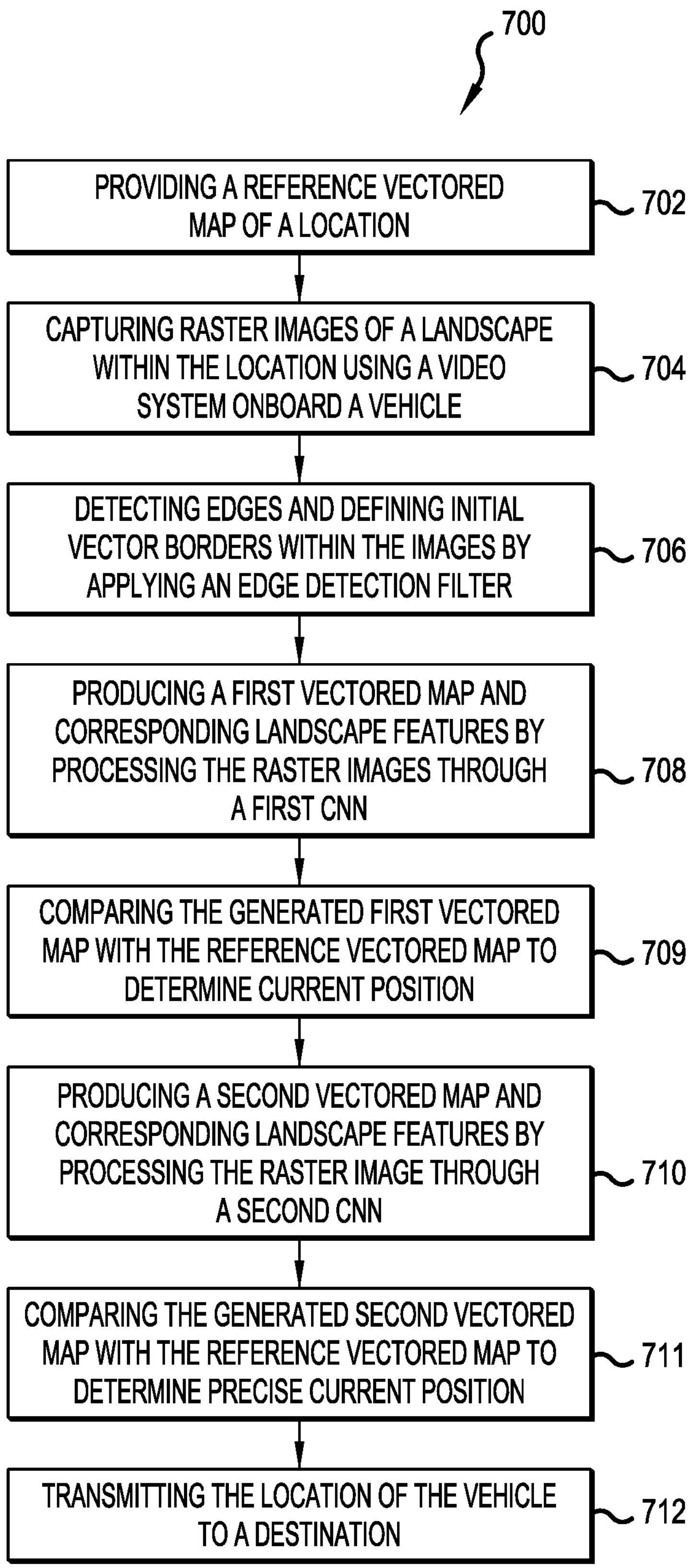
FIG. 7 is a flowchart of an alternative method according to an embodiment.

FIG. 7 is a flowchart of a series of operations 700 according to an alternative embodiment. At 702, a reference vectored map of a location is provided. This reference vectored map is stored onboard an autonomous vehicle. In the system of FIG. 1, for example, the reference vectored map can be stored in storage 110. At 704, images of a landscape within the location are captured, for example, by an optical system such as optical-electrical imaging system 112 of FIG. 1. Processing of the images takes place at 706, where an edge detection (e.g. Sobel) filter is applied to detect edges and define initial vector borders.

A first vectored map is then prepared by processing the images with a first CNN at 708. Although the first vectored map in FIG. 7 is prepared using the output of the Sobel filter, the vectored map can also be prepared from raster images directly. Processing raster images can also be done in parallel by the edge detection (e.g. Sobel) filter and the first CNN.

When the first vectored map of the location is ready, it is compared with the reference vectored map. Location can be determined by comparing vectors at given coordinates. The differences between the first vectored map generated by the vehicle and the reference vectored map are calculated at 709 by calculating the differences between the plurality of tensors, each tensor representing the border around some landscape area.

In an embodiment, creation of a second vectored map is done at 710 by a second CNN.

The first and second CNNs can be pretrained using available datasets relevant to identifying different sets of landscape. The second CNN can be trained with landscape data to provide more specific classifications. For example, where the first CNN makes a determination of "water," the second CNN can be used to determine whether the water is a lake, reservoir, river, ocean, and so on.

When the second vectored map of the location is ready, it is compared with the reference vectored map. Location can be determined by comparing vectors at given coordinates. The differences between the second vectored map generated by the vehicle and the reference vectored map are calculated at 711 by calculating the differences between the plurality of tensors, each tensor representing the border around some landscape area. In an embodiment, the second vectored map includes details not in the first vectored map, which can provide a more refined and accurate representation of the landscape. For instance, the second vectored map might include additional boundary details, such as newly identified edges or subtle variations in terrain that were not detected by the first CNN. It may also reveal updated regions that have changed since the reference map was created, such as newly constructed buildings, roads, or changes in water levels that affect the landscape. Another example can include the identification of smaller sub-regions within a broader category-such as distinguishing between different types of vegetation within a forested area or identifying varying levels of urban density within an urban area. These finer details allow for more precise navigation and location determination by using the richer data captured in the second vectored map.

Once the vehicle's position has been determined from the differences in the vectored maps, the vehicle's location is transmitted to a destination at 712. In an embodiment, the destination can be a remote operator unit or a traffic-control system. Accordingly, the transmission at 712 can be to a device remote to the instant system, such as system 100 in FIG. 1. Alternatively, the determined position can be used to make position changes for the vehicle as described in connection with FIG. 6.

The invention claimed is:

1. A method for navigating an autonomous vehicle in a location without the use of real-time satellite data, the method comprising:

providing a reference vectored map of the location, in a storage medium onboard the autonomous vehicle;

capturing a raster image of a landscape within the location using a imaging system onboard the autonomous vehicle;

creating a filtered image by applying an edge detection filter to the raster image to detect edges and define initial vector borders within the raster image of the landscape;

processing, under control of a processor onboard the autonomous vehicle, the filtered image through a first convolutional neural network (CNN) to produce a first vectored map;

comparing, under control of the processor onboard the autonomous vehicle, the generated first vectored map with the reference vectored map to determine the current position of the autonomous vehicle within the location; and changing the position of the autonomous vehicle based on the determined current position of the autonomous vehicle.

2. The method of claim 1, further comprising:

processing, by an FPGA control block onboard the autonomous vehicle, the raster image with a second CNN to create a second vectored map, wherein the second vectored map comprises details not found in the first vectored map.

3. The method of claim 1, further comprising pretraining the first CNN on datasets comprising different types of landscape.

4. The method of claim 3, wherein the pretraining includes using training landscape datasets comprising images of specific environments, including urban, rural, forested, or aquatic environments.

5. The method of claim 1, further comprising fine-tuning the second CNN using real-time captured images specific to the autonomous vehicle's operational environment.

6. The method of claim 2, wherein the FPGA control block is further configured to adjust processing priorities between the edge detection filter and convolutional neural networks based on real-time computational load and power availability onboard the autonomous vehicle.

7. The method of claim 1, where the processing the filtered image through the first convolutional neural network (CNN) to produce the first vectored map further comprises using corresponding detected sets of landscape in the filtered images.

8. The method of claim 1, wherein creating a filtered image by applying an edge detection filter to the raster image to detect edges and define initial vector borders within the raster image includes applying a Sobel filter to determine the borders between different types of landscape areas, and turning these borders into vectors, wherein each vector is defined by the coordinates of two points, forming straight lines without any curves, to represent borders within the first vectored map.

9. The method of claim 1, wherein comparing the first vectored map and the reference vectored map comprises calculating the distance between vectors in the first vectored map and the reference map by subtracting their respective coordinates, with a lower calculated distance indicating a higher similarity between vectors, and using a quantity of similar vectors to assess the overall similarity of the first and previously stored vectored maps.

10. A system for navigating an autonomous vehicle in a location without using real-time satellite data, the system comprising:

- an autonomous vehicle;
- a processor onboard the autonomous vehicle;
- an onboard memory operably coupled to the processor;
- a nonvolatile storage medium for storing raster images and reference vectored maps of the location;
- an optical system comprising a camera, configured for capturing raster images of a landscape within the location;
- an image processing module comprising an edge detection filter and one or more convolutional neural networks (CNN), wherein the edge detection filter is configured for detecting edges and defining initial vector borders within the raster images and wherein the one or more CNNs are configured for producing a first vectored map with corresponding detected sets of landscape by processing the filtered images through one or more CNNs;
- a control block, operably connected to the image processing module, configured for comparing the generated first vectored map with the previously stored reference vectored maps to determine a current position within the location; and
- a transmitter, configured for sending the current position within the location to a destination.

11. The system of claim 10, wherein an onboard control block processes the raster images with a second CNN to create a second vectored map, wherein the second vectored map comprises details not found in the first vectored map.

12. The system of claim 10, wherein the optical system comprises an FPGA control block configured to process images through the edge detection filter and the first CNN and a second CNN.

13. The system of claim 10, wherein the first CNN has been pretrained on datasets comprising different types of landscape.

14. The system of claim 13, wherein the pretraining of the first CNN includes using training landscape datasets comprising images of specific environments, including urban, rural, forested, or aquatic environments.

15. The system of claim 13, wherein the second CNN has been fine-tuned using real-time captured images specific to the autonomous vehicle's operational environment and wherein fine-tuning is adjusted based on feedback from location determination accuracy assessments.

16. A method for determining the position of an autonomous vehicle without the use of real-time satellite data satellite data, the method comprising:

- providing a reference vectored map of a location, in a storage medium onboard the autonomous vehicle;
- capturing a raster image of a landscape within the location using a imaging system onboard the autonomous vehicle;
- creating a filtered image by applying an edge detection filter to the raster image to detect edges and define initial vector borders within the raster image of the landscape;
- processing, under control of a processor onboard the autonomous vehicle, the filtered image through a first convolutional neural network (CNN) to produce a first vectored map;
- comparing, under control of the processor onboard the autonomous vehicle, the generated first vectored map with the reference vectored map to determine the current position of the autonomous vehicle within the location.

17. The method of claim 16, further comprising transmitting the current position of the autonomous vehicle to a remote device.

18. The method of claim 16, further comprising storing the location of the autonomous vehicle to the storage medium.

19. The method of claim 16, wherein a Field-Programmable gate array (FPGA) control block adjusts processing priorities between the edge detection filter and convolutional neural networks based on real-time computational load and power availability onboard the autonomous vehicle.

20. The method of claim 16, wherein the processing the filtered image through the first convolutional neural network (CNN) to produce the first vectored map further comprises using corresponding detected sets of landscape in the filtered images.

* * * * *